(12) United States Patent
Tanaka et al.

(10) Patent No.: US 9,417,384 B2
(45) Date of Patent: Aug. 16, 2016

(54) OPTO-ELECTRIC HYBRID MODULE

(71) Applicant: NITTO DENKO CORPORATION, Ibaraki-shi, Osaka (JP)

(72) Inventors: Naoyuki Tanaka, Ibaraki (JP); Yasuto Ishimaru, Ibaraki (JP); Naoki Shibata, Ibaraki (JP); Yuichi Tsujita, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/898,547

(22) PCT Filed: May 7, 2014

(86) PCT No.: PCT/JP2014/062221
§ 371 (c)(1),
(2) Date: Dec. 15, 2015

(87) PCT Pub. No.: WO2014/203635
PCT Pub. Date: Dec. 24, 2014

(65) Prior Publication Data
US 2016/0131834 A1 May 12, 2016

(30) Foreign Application Priority Data
Jun. 20, 2013 (JP) .................................. 2013-129655

(51) Int. Cl.
*G02B 6/12* (2006.01)
(52) U.S. Cl.
CPC ........ *G02B 6/12002* (2013.01); *G02B 6/12004* (2013.01)
(58) Field of Classification Search
CPC ....... G02B 6/43; G02B 6/4257; G02B 6/4245
USPC ................................................ 385/14, 88–92
See application file for complete search history.

(56) References Cited

U.S. PATENT DOCUMENTS 7,630,600 B2 * 12/2009 Shimizu ............. G02B 6/12004
  385/129
7,809,220 B2 * 10/2010 Kim ................... G02B 6/12002
  385/129

(Continued)

FOREIGN PATENT DOCUMENTS

| JP | 2000-298221 A | 10/2000 |
| JP | 2007-156026 A | 6/2007 |
| JP | 2010-190994 A | 9/2010 |

(Continued)

OTHER PUBLICATIONS

Notification of Transmittal of Translation of the International Preliminary Report on Patentability (Form PCT/IB/338) issued in counterpart Intenational Application No. PCT/JP2014/062221 mailed Dec. 30, 2015 with Forms PCT/IB373 and PCT/ISA/237. (5 pages).

(Continued)

*Primary Examiner* — Ellen Kim
(74) *Attorney, Agent, or Firm* — Westerman, Hattori, Daniels & Adrian, LLP

(57) ABSTRACT

An opto-electric hybrid module is provided, which is excellent in bending resistance and optical element mountability. In the opto-electric hybrid module, a light-path core of an optical waveguide is provided on a surface of an under-cladding layer, and non-light-path dummy cores are provided on opposite sides of the light-path core in spaced relation to the light-path core as projecting from the surface of the under-cladding layer. An electric circuit having mounting pads is provided on top surfaces of the dummy cores. An over-cladding layer is provided on side surfaces and a top surface of the light-path core, and projects to cover the core. The non-light-path dummy cores each have an elastic modulus that is set higher than the elastic modulus of the under-cladding layer and the elastic modulus of the over-cladding layer. The optical element is mounted on the mounting pads, and positioned above the projecting over-cladding layer.

1 Claim, 4 Drawing Sheets

(56) References Cited

U.S. PATENT DOCUMENTS

| | | | |
|---|---|---|---|
| 8,750,656 B2 * | 6/2014 | Wu | G02B 6/4214 385/14 |
| 2010/0061679 A1 | 3/2010 | Hayashi et al. | |
| 2010/0209054 A1 | 8/2010 | Hodono | |
| 2011/0064354 A1 | 3/2011 | Nishio et al. | |
| 2012/0251036 A1 | 10/2012 | Inoue et al. | |

FOREIGN PATENT DOCUMENTS

| | | | |
|---|---|---|---|
| JP | 2011-64910 A | 3/2011 |
| JP | 2012-208306 A | 10/2012 |

OTHER PUBLICATIONS

International Search Report dated Jul. 22, 2014, issued in counterpart International Application No. PCT/JP2014/062221 (2 pages).

* cited by examiner

OPTO-ELECTRIC HYBRID MODULE

TECHNICAL FIELD

The present invention relates to an opto-electric hybrid module which includes an optical waveguide, an electric circuit provided directly on the optical waveguide and an optical element mounted on the electric circuit.

BACKGROUND ART

Opto-electric hybrid modules are typically produced by: individually producing a flexible circuit board including an electric circuit provided on a surface of an insulation layer, and an optical waveguide including an under-cladding layer, a core and an over-cladding layer stacked in this order; bonding a back surface of the insulation layer of the flexible circuit board to a surface of the over-cladding layer of the optical waveguide with an adhesive agent; and mounting an optical element on a predetermined portion (mounting pads) of the electric circuit. The opto-electric hybrid module is flexible, and is advantageous for use in a bent state in a small space and for use in a movable portion such as a hinge portion to meet a recent demand for size reduction of electronic devices and the like.

An opto-electric hybrid module as shown in a transverse sectional view of FIG. 5 (see, for example, PTL1) is proposed, which includes an electric circuit 4 provided directly on a surface of an over-cladding layer 13 of an optical waveguide W1 (without provision of an insulation layer) for simplification of the production method thereof. The optical element 5 is mounted on a predetermined portion (mounting pads 4a) of the electric circuit 4. In FIG. 5, a reference character 11 designates an under-cladding layer of the optical waveguide W1, and a reference character 12 designates a core of the optical waveguide W1.

In the opto-electric hybrid module, the elastic moduli of the under-cladding layer 11 and the over-cladding layer 13 are each set at a low level for improvement of the bending resistance of the module.

RELATED ART DOCUMENT

Patent Document

PTL1: JP-A-2007-156026

SUMMARY OF INVENTION

If the elastic modulus of the over-cladding layer 13 is set at a low level in the prior-art opto-electric hybrid module in which the mounting pads 4a are provided on the surface of the over-cladding layer 13, however, the over-cladding layer 13 is liable to be deformed by ultrasonic vibrations, a press load and/or the like in the ultrasonic mounting of the optical element 5. This makes it difficult to properly mount the optical element 5 on the mounting pads 4a provided on the surface of the over-cladding layer 13, resulting in mounting failure.

If the elastic modulus of the over-cladding layer 13 is set at a higher level to improve the optical element mountability, the bending resistance of the opto-electric hybrid module is liable to be deteriorated.

In view of the foregoing, it is an object of the present invention to provide an opto-electric hybrid module which is excellent in bending resistance and optical element mountability.

According to the present invention to achieve the above object, there is provided an opto-electric hybrid module, which includes: an optical waveguide; an electric circuit provided directly on the optical waveguide and having mounting pads; and an optical element mounted on the mounting pads; wherein the optical waveguide includes an under-cladding layer, a linear light-path core provided on a surface of the under-cladding layer as projecting from the surface of the under-cladding layer, an over-cladding layer provided on side surfaces and a top surface of the light-path core to cover the light-path core, thereby the optical waveguide is formed as having a projection in shape, and non-light-path dummy cores provided on opposite sides of the light-path core in predetermined spaced relation to the light-path core, each of the non-light-path dummy cores having a higher elastic modulus than the under-cladding layer and the over-cladding layer; wherein the mounting pads are provided on top surfaces of the non-light-path dummy cores, and the optical element mounted on the mounting pads is positioned above a portion of the over-cladding layer which covers the top surface of the light-path core.

In the inventive opto-electric hybrid module, the mounting pads are not provided on the surface of the over-cladding layer but on the top surfaces of the non-light-path dummy cores additionally provided. The non-light-path dummy cores are provided on the opposite sides of the light-path core in spaced relation to the light-path core, and each have a higher elastic modulus than the over-cladding layer. Therefore, the non-light-path dummy cores are less liable to be deformed than the over-cladding layer even if vibrations, a press load and/or the like are applied when the optical element is mounted on the mounting pads. That is, the inventive opto-electric hybrid module is excellent in optical element mountability, and is free from optical element mounting failure. As described above, the inventive opto-electric hybrid module additionally includes the non-light-path dummy cores each having a higher elastic modulus than the under-cladding layer and the over-cladding layer, and the mounting pads are provided on the top surfaces of the non-light-path dummy cores. Therefore, the under-cladding layer and the over-cladding layer may each have a lower elastic modulus as in the prior art. Accordingly, the inventive opto-electric hybrid module is excellent in bending resistance.

In the inventive opto-electric hybrid module, the non-light-path dummy cores each having a higher elastic modulus than the under-cladding layer and the over-cladding layer are provided on the opposite sides of the light-path core in predetermined spaced relation to the light-path core, and the mounting pads are provided on the top surfaces of the non-light-path dummy cores. Therefore, the non-light-path dummy cores are less liable to be deformed by vibrations, a press load and/or the like applied when the optical element is mounted on the mounting pads. That is, the inventive opto-electric hybrid module is excellent in optical element mountability, and is free from optical element mounting failure. In the inventive opto-electric hybrid module, the mounting pads are provided on the top surfaces of the non-light-path dummy cores each having a higher elastic modulus than the under-cladding layer and the over-cladding layer. Therefore, the under-cladding layer and the over-cladding layer may each have a lower elastic modulus as in the prior art. Accordingly, the inventive opto-electric hybrid module is excellent in bending resistance.

DESCRIPTION OF EMBODIMENT

An embodiment of the present invention will hereinafter be described in detail based on the attached drawings.

Figure 1A:
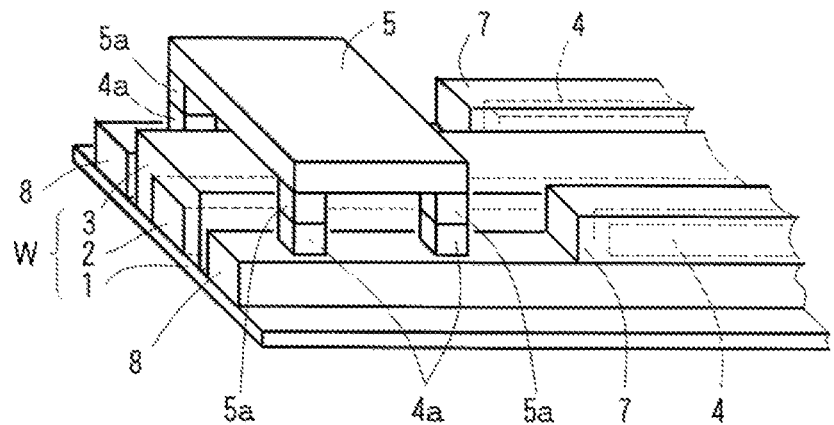
FIGS. 1A, 1B and 1C are a perspective view, a longitudinal sectional view and a transverse sectional view, respectively, schematically illustrating an opto-electric hybrid module according to one embodiment of the present invention.
Figure 1B:
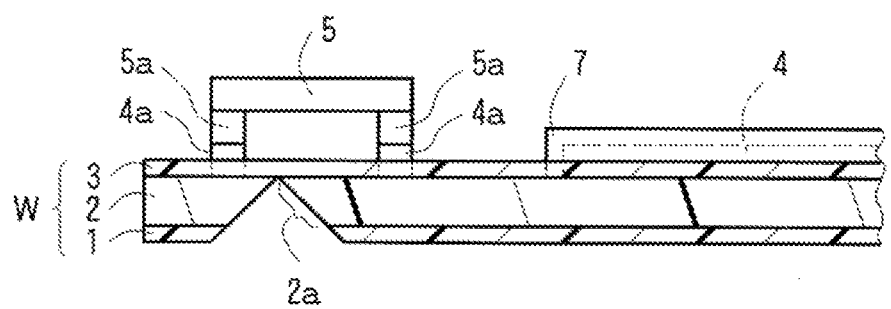
Figure 1C:
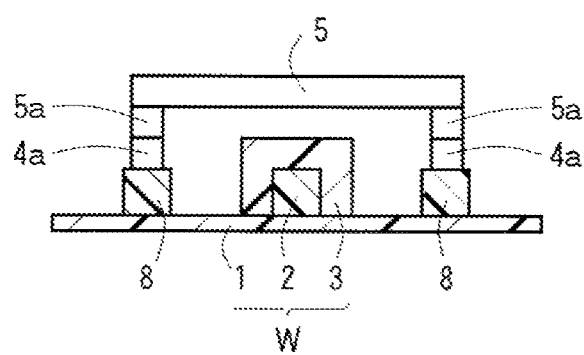

FIGS. 1A, 1B and 1C are a perspective view, a longitudinal sectional view and a transverse sectional view, respectively, schematically illustrating an end portion (major portion) of an opto-electric hybrid module according to one embodiment of the present invention. In the opto-electric hybrid module according to this embodiment, a light path core 2 is provided on a surface of an under-cladding layer 1 of an optical waveguide W, and non-light-path dummy cores 8 (not serving as light paths) are provided on opposite sides of the light-path core 2 in spaced relation to the light-path core 2 as projecting from the surface of the under-cladding layer 1. An electric circuit 4 having mounting pads 4a is provided on top surfaces of the dummy cores 8. An over-cladding layer 3 is provided on side surfaces and a top surface of the light-path core 2, and projects to cover the core 2. The non-light-path dummy cores 8 each have a higher elastic modulus than the under-cladding layer 1 and the over-cladding layer 3. An optical element 5 is mounted on the mounting pads 4a, and positioned above the projecting over-cladding layer 3.

A major characteristic feature of the present invention is that the non-light-path dummy cores 8 each having a higher elastic modulus than the under-cladding layer 1 and the over-cladding layer 3 are provided on the opposite sides of the light-path core 2 in spaced relation to the light-path core 2, and the mounting pads 4a are provided on the top surfaces of the non-light-path dummy cores 8.

More specifically, the under-cladding layer 1 of the optical waveguide W is flat, and the light-path core 2 and the non-light-path dummy cores 8 each have a quadrilateral section and project from the surface of the under-cladding layer 1. The over-cladding layer 3 is provided on the side surfaces and the top surface of the projecting light-path core 2, and projects to cover the core 2. The core 2 has a light reflecting surface 2a disposed below the center portion of the optical element 5 and inclined at 45 degrees with respect to an axis of the core 2. The light reflecting surface 2a reflects light to deflect a light path, so that the light can be transmitted between the core 2 and the optical element 5.

As described above, the electric circuit 4 is provided on the top surfaces of the non-light-path dummy cores 8. The optical element 5 is mounted on the electric circuit 4 with lower end surfaces of its electrodes 5a in abutment against top surfaces of the mounting pads 4a of the electric circuit 4. A portion of the electric circuit 4 excluding the mounting pads 4a is covered with a cover-lay 7.

The opto-electric hybrid module may be produced, for example, in the following manner.

First, a flat base 10 (see FIG. 2A) to be used for formation of an under-cladding layer 1 thereon is prepared. Exemplary materials for the base 10 include metals such as stainless steel, glass, quartz, silicon and resins.

Figure 2A:
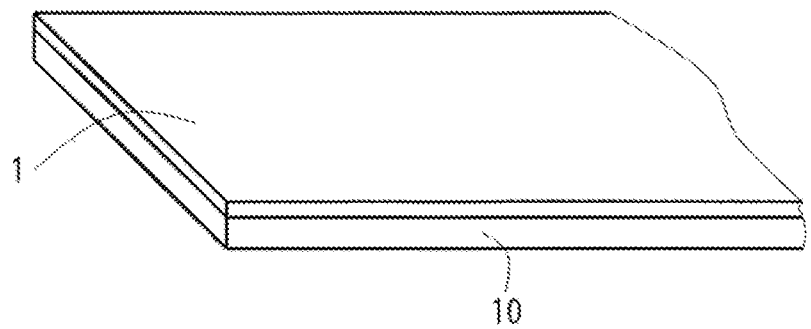
FIG. 2A is a schematic diagram for explaining a method of forming an under-cladding layer of an optical waveguide of the opto-electric hybrid module.

Then, as shown in a perspective view of FIG. 2A, the under-cladding layer 1 is formed in a flat shape on a surface of the base 10. Exemplary materials for the under-cladding layer 1 include photosensitive resins and thermosetting resins. The formation of the under-cladding layer 1 may be achieved by a formation method suitable for the material to be used. The under-cladding layer 1 has a thickness of, for example, 1 to 50 μm.

Figure 2B:
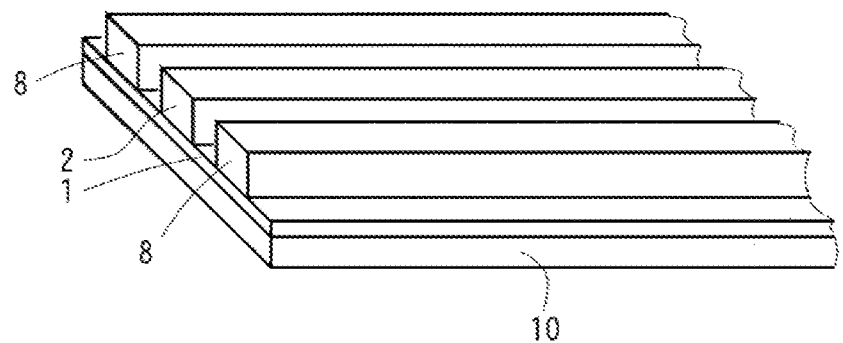
FIG. 2B is a schematic diagram for explaining a method of forming a core and dummy cores of the optical waveguide.

Next, as shown in a perspective view of FIG. 2B, a light-path core 2 and non-light-path dummy cores 8 are formed on a surface of the under-cladding layer 1 as projecting from the surface of the under-cladding layer 1. The formation of the core 2 and the formation of the non-light-path dummy cores 8 are simultaneously achieved, for example, by a photolithography method using the same photosensitive resin as a material. The material (photosensitive resin) for the core 2 and the dummy cores 8 is selected so that the core 2 and the dummy cores 8 each have a higher elastic modulus than the under-cladding layer 1 and an over-cladding layer 3 to be formed in the subsequent step. The core 2 and the dummy cores 8 each have a height and a width of, for example, 5 to 100 μm.

Figure 2C:
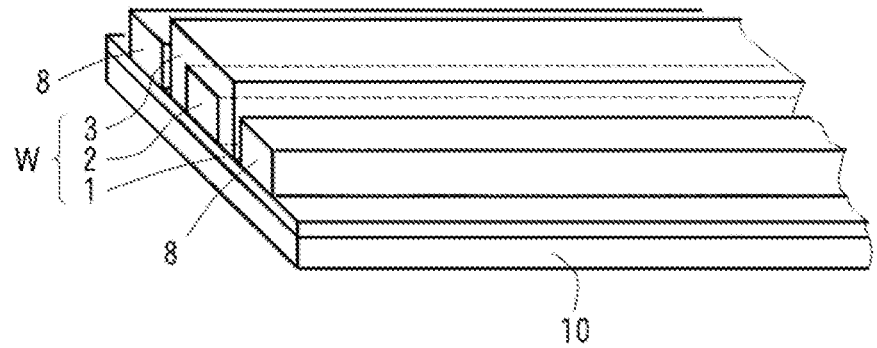
FIG. 2C is a schematic diagram for explaining a method of forming an over-cladding layer of the optical waveguide.

Then, as shown in a perspective view of FIG. 2C, an over-cladding layer 3 is formed on side surfaces and a top surface of the core 2. The formation of the over-cladding layer 3 is achieved, for example, by a photolithography method using a photosensitive resin as a material. The over-cladding layer 3 has a thickness (film thickness) of, for example, 1 to 50 μm. In this manner, an optical waveguide W is fabricated on the surface of the base 10.

Figure 3A:
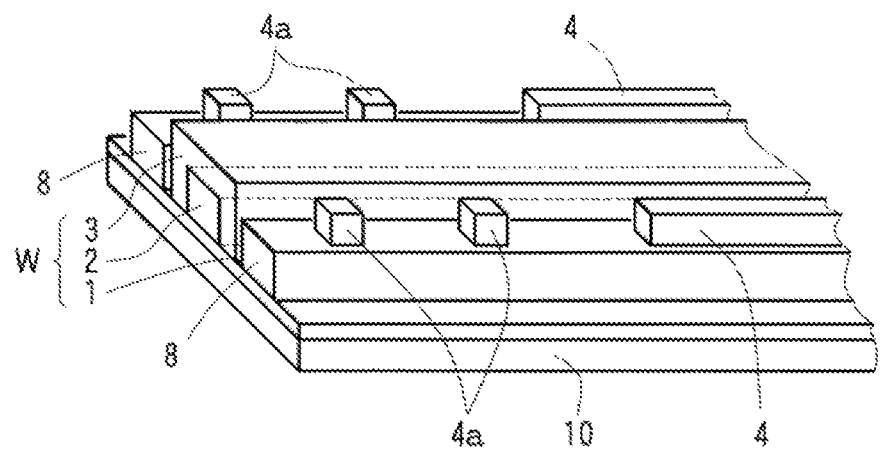
FIG. 3A is a schematic diagram for explaining a method of forming an electric circuit of the opto-electric hybrid module.

Next, as shown in a perspective view of FIG. 3A, an electric circuit 4 is formed on top surfaces of the dummy cores 8 of the optical waveguide W, for example, by a semi-additive method.

Figure 3B:
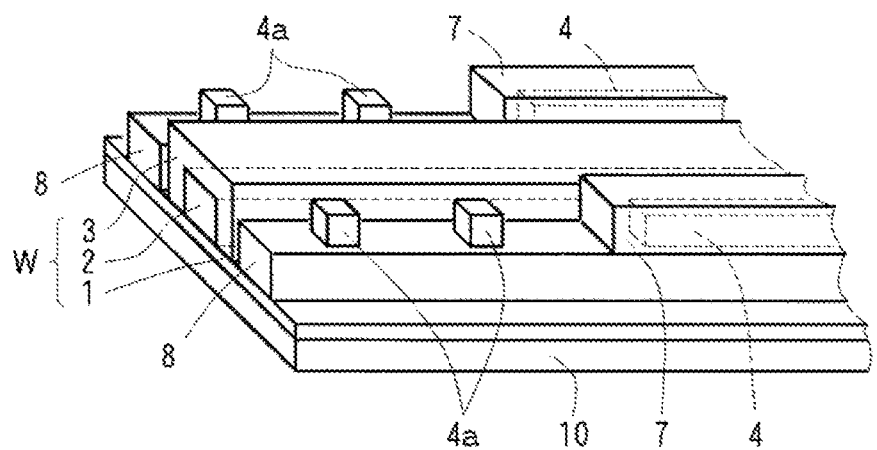
FIG. 3B is a schematic diagram for explaining a method of forming a cover-lay of the opto-electric hybrid module.

In turn, as shown in a perspective view of FIG. 3B, a photosensitive insulative resin is applied onto a portion of the electric circuit 4 excluding optical element mounting portions (mounting pads 4a) on which an optical element 5 (see FIG. 4B) is to be mounted. Then, a cover-lay 7 is formed from the photosensitive insulative resin by a photolithography method. The cover-lay 7 may be formed to cover only the portion of the electric circuit 4 as shown in FIG. 3B, or may be formed to additionally cover the over-cladding layer 3.

Figure 4A:
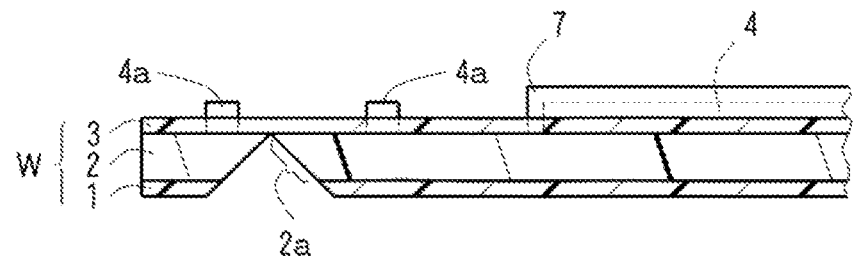
FIG. 4A is a schematic diagram for explaining a method of forming a light reflecting surface on the core.

Subsequently, as shown in a longitudinal sectional view of FIG. 4A, the base 10 (see FIG. 3B) is removed from the back surface of the under-cladding layer 1, and then a predetermined portion of the core 2 is cutoff from a backside of the under-cladding layer 1 by means of a cutting blade or by a laser processing method. Thus, a light reflecting surface 2a inclined at 45 degrees with respect to an axis of the core 2 is formed.

Figure 4B:
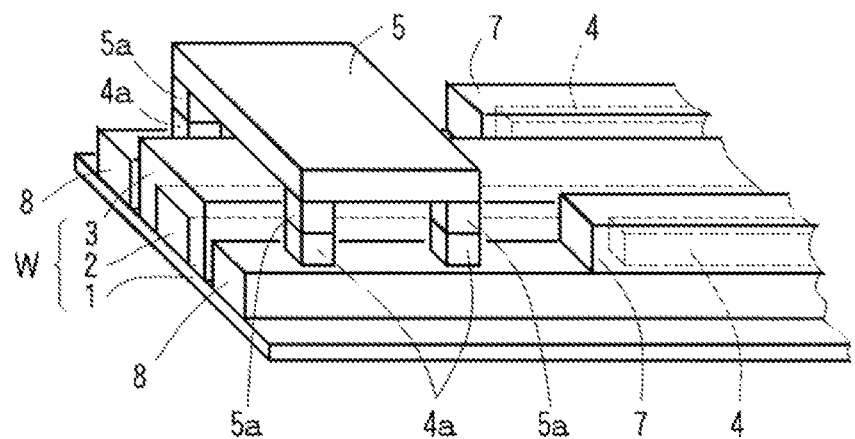
FIG. 4B is a schematic diagram for explaining a method of mounting an optical element of the opto-electric hybrid module.

Then, as shown in a perspective view of FIG. 4B, lower end surfaces of electrodes 5a of the optical element 5 are brought into abutment against top surfaces of the predetermined portions (mounting pads 4a) of the electric circuit 4, so that the optical element 5 is mounted on the electric circuit 4 by an ultrasonic mounting method or the like. At this time, the dummy cores 8 on which the mounting pads 4a are provided are not liable to be deformed by vibrations, a press load and/or the like applied for mounting the optical element 5, because the dummy cores 8 each have a higher elastic modulus than the under-cladding layer 1 and the over-cladding layer 3. This ensures excellent optical element mountability to prevent optical element mounting failure. A lower surface of the center portion of the optical element 5 is positioned above the projecting over-cladding layer 3 to be spaced a predetermined distance from the over-cladding layer 3 (see FIG. 1C). Thus, the opto-electric hybrid module is produced.

In this embodiment, the light path core 2 and the dummy cores 8 are simultaneously formed by using the same material, but may be formed by using different materials in different steps. In this case, the elastic modulus of the light-path core 2 may be not higher than the elastic modulus of the under-cladding layer 1 and the elastic modulus of the over-cladding layer 3.

In this embodiment, the electric circuit 4 is formed after the formation of the over-cladding layer 3, but may be formed before the formation of the over-cladding layer 3 after the formation of the light-path core 2 and the dummy cores 8. Further, the formation of the cover-lay 7 may precede the formation of the over-cladding layer 3. In this case, the portion of the electric circuit 4 excluding the mounting pads 4a may be covered with the over-cladding layer 3 rather than with the cover-lay 7. That is, when the over-cladding layer 3 is formed, the portion of the electric circuit 4 as well as the light-path core 2 may be covered with the over-cladding layer 3.

In this embodiment, a space defined between the optical waveguide W and the optical element 5 may be sealed with a sealing resin.

Next, an example of the present invention will be described in conjunction with a conventional example. However, it should be understood that the present invention be not limited to the inventive example.

EXAMPLES

An opto-electric hybrid module was produced in the same manner as in the aforementioned embodiment. At this time, an under-cladding layer and an over-cladding layer of an optical waveguide each had an elastic modulus of 0.3 Pa, and a light-path core and non-light-path dummy cores each had an elastic modulus of 1.5 Pa. These elastic moduli were each measured by means of an elastic modulus measuring device (MMT-X7 available from Matsuzawa Co., Ltd.) Further, an ultrasonic mounting machine (flip-chip bonder FCB3 available from Panasonic Factory Solutions Co., Ltd.) was used for the mounting of an optical element (photo diode KPDG006HA1 available from Kyocera Corporation). An element temperature of 150° C., an opto-electric hybrid board temperature of 50° C. (the temperature of an opto-electric hybrid module before the mounting of the optical element), a press load of 1.0 N, an ultrasonic output of 3.0 W, and a mounting period of 0.5 seconds were employed as conditions for the mounting.

Conventional Example

Figure 5:
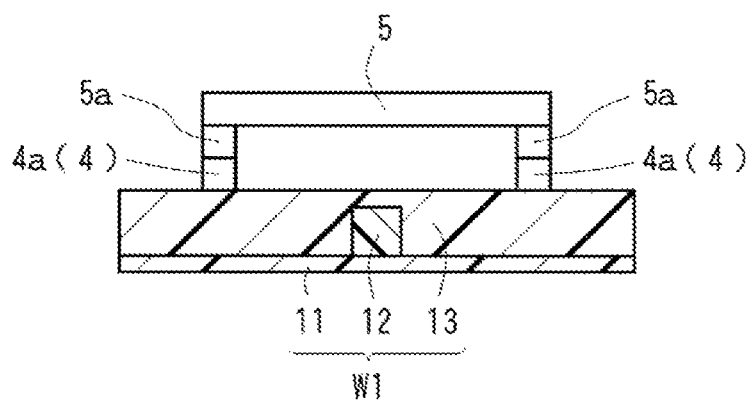
FIG. 5 is a transverse sectional view schematically illustrating a prior-art opto-electric hybrid module.

An opto-electric hybrid module (see FIG. 5) was produced in substantially the same manner as in the Example, except that an over-cladding layer having a flat surface was formed and then an electric circuit was formed on the surface of the over-cladding layer.

Evaluation for Bending Resistance

An IPC (Interconnecting and Packaging Electronic Circuits) bending resistance test was performed on each of the opto-electric hybrid modules of the Example and the Conventional Example to measure the number of times of bending at which a bent portion was broken. A stroke width of 20 mm, a speed of 20 mm/sec and a bending radius of 1 mm were employed as conditions for the measurement. As a result, the number of the times of bending at the breakage was 8520 in the Example, and 8594 in the Conventional Example. The results indicate that both the Example and the Conventional Example were excellent in bending resistance.

Evaluation for Optical Element Mountability

The shear strength of the optical element in each of the opto-electric hybrid modules of the Example and the Conventional Example was measured. The measurement was performed at a speed of 100 mm/sec at a height of 100 μm as measured from the top surface of the electric circuit. As a result, the shear strength of the optical element was 1.02 N in the Example, and 0.44 N in the Conventional Example. The results indicate that the Example ensured more excellent optical element mountability than the Conventional Example.

While a specific form of the embodiment of the present invention has been shown in the aforementioned inventive example, the inventive example is merely illustrative of the invention but not limitative of the invention. It is contemplated that various modifications apparent to those skilled in the art could be made within the scope of the invention.

The present invention is applicable to a case in which the opto-electric hybrid module is required to have excellent bending resistance and excellent optical element mountability.

REFERENCE SIGNS LIST

W: OPTICAL WAVEGUIDE
1: UNDER-CLADDING LAYER
2: CORE
3: OVER-CLADDING LAYER
4: ELECTRIC CIRCUIT
4a: MOUNTING PAD
5: OPTICAL ELEMENT
8: DUMMY CORE

The invention claimed is:

1. An opto-electric hybrid module comprising:
    an optical waveguide;
    an electric circuit provided directly on the optical waveguide and comprising mounting pads; and
    an optical element mounted on the mounting pads;
    wherein the optical waveguide includes an under-cladding layer; a linear light-path core provided on a surface of the under-cladding layer as projecting from the surface of the under-cladding layer; an over-cladding layer provided on side surfaces and a top surface of the light-path core to cover the light-path core, thereby the optical waveguide is formed as having a projection in shape; and non-light-path dummy cores provided on opposite sides of the light-path core in predetermined spaced relation to the light-path core, each of the non-light-path dummy cores having a higher elastic modulus than the under-cladding layer and the over-cladding layer;
    wherein the mounting pads are provided on top surfaces of the non-light-path dummy cores, and the optical element mounted on the mounting pads is positioned above a portion of the over-cladding layer which covers the top surface of the light-path core.

* * * * *